A. E. MARTIN.
TREE-PROTECTORS.

No. 187,979. Patented March 6, 1877.

Witnesses:
Henry Chadbourn
F. Allen.

Inventor:
Austin E. Martin
by
Alban Andrew.
his attorney.

UNITED STATES PATENT OFFICE.

AUSTIN E. MARTIN, OF BEVERLY, MASSACHUSETTS.

IMPROVEMENT IN TREE-PROTECTORS.

Specification forming part of Letters Patent No. 187,979, dated March 6, 1877; application filed December 22, 1876.

*To all whom it may concern:*

Be it known that I, AUSTIN E. MARTIN, of Beverly, in the county of Essex and State of Massachusetts, have invented certain new and useful Improvements in Tree-Protectors; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to improvements in tree-protectors for the purpose of protecting trees from the ravages of canker-worms, &c.; and my invention consists of a cylindrical sleeve of cloth, that is secured, by nails, &c., at the top and bottom, to the trunk of the tree, in combination with a conical or tapering cloth protector, secured at its upper end to the upper end of the aforesaid cylindrical sleeve or band, or to the trunk of the tree, and provided in its lower larger end with a suitable hoop or flexible expander, by which the proper shape of the protector is retained. Both the inner sleeve and the protector are coated or saturated with a suitable water-proof varnish, and a sticky cement is applied on the outside of the sleeve, as well as on the inside of the tapering protector, by which the canker-worms that attempt to crawl up on the trunk are arrested, and prevented from ascending above the protector.

The conical protector is not gathered up in folds or plaits, but cut out as a smooth and continuous surface from one or more pieces, and is lapped over, so as to allow the protector to be expanded and adjusted in relation to the growth of the trunk of the tree.

By this arrangement I am able to produce a tree-protector that will prevent water from ever reaching the sticky cement, as the rain-water that strikes the outside of the conical protector will be conducted downward without striking through the water-proof cloth; and the water that passes down on the outside of the trunk, and between it and the inside of the cylindrical water-proof sleeve, will not soak through to the sticky cement, but will pass out through the lower part of the said sleeve.

This protector will retain its proper shape even if the trunk should be considerably inclined from a vertical position, as the water-proof varnish with which it is coated renders it stiff and hard—much the same as if it had been made of zinc or other metallic substance.

Figure 1:
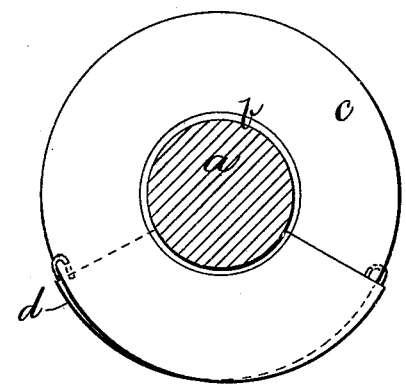
Figure 2:
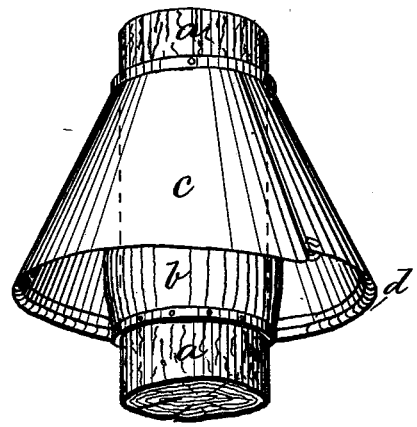

On the accompanying drawings, Figure 1 represents a plan view of my invention. Fig. 2 represents a perspective view of the same, and Fig. 3 represents a longitudinal section.

Similar letters refer to similar parts wherever they occur on the different parts of the drawings.

*a* represents the trunk of the tree to which the protector is to be attached. *b* represents the cylindrical sleeve, open at the top and bottom, where it is secured, by tacks or nails, to the trunk of the tree. *c* represents the tapering or conical protector, united at its upper end to the upper end of the sleeve *b*, or to the trunk of the tree at the junction with the said sleeve, and provided in its lower end with a suitable hoop or flexible expander, *d*, as shown in the drawings.

Figure 3:
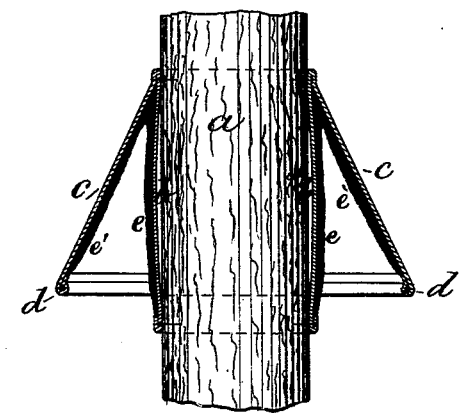

Both the sleeve *b* and tapering protector *c* are coated or saturated with a water-proof varnish, so as to render them water-tight; and, furthermore, the sleeve is coated on its outside, and the conical protector on its inside, with a sticky cement, *e e'*, as shown in black sections in Fig. 3, for the purpose hereinbefore set forth and described.

I am aware of the patents granted, respectively, to J. Foster, February 15, 1858, No. 19,357, Henry L. Ordway, August 25, 1863, No. 39,672, and G. W. Grader, June 27, 1876, No. 179,397; and I wish to state that I do not claim anything as set forth in said patents.

Having thus fully described the nature and construction of my invention, I wish to secure by Letters Patent, and claim—

The herein-described tree-protector, consisting of the water-proof sleeve *b*, in combination with the water-proof conical or tapering protector *c*, with its hoop or expander *d*, and having the sticky cement *e e'* applied to it, in the manner and for the purpose substantially as set forth.

In testimony that I claim the foregoing as my own invention I have affixed my signature in presence of two witnesses.

AUSTIN E. MARTIN.

Witnesses:
ALBAN ANDRÉN,
SAMUEL W. TORREY.